UNITED STATES PATENT OFFICE.

WILLIAM D. KILBOURN, OF TOOELE, UTAH.

PROCESS FOR THE REDUCTION OF METALS FROM THEIR ORES BY CARBON FROM SOLID FUEL.

1,148,782.  Specification of Letters Patent.  Patented Aug. 3, 1915.

No Drawing.  Application filed January 14, 1914.  Serial No. 812,054.

*To all whom it may concern:*

Be it known that I, WILLIAM D. KILBOURN, a citizen of the United States, and a resident of Tooele, in the county of Tooele and State of Utah, have invented a new and Improved Process for the Reduction of Metals from Their Ores by Carbon from Solid Fuel, of which the following is a full, clear, and exact description.

My invention is an improvement in processes for the reduction of metals from their ores by carbon from solid fuel and relates in particular to a method of economizing in the amount of fuel consumed and of restricting the high temperatures substantially to the reduction zone of the furnaces, thus avoiding the furnace troubles incident to high heating in other parts of the furnace.

The principal object of my invention is to provide an efficient method whereby the combustible material or fuel used for the furnace charge will not begin to burn in the furnace until the fuel has reached a predetermined point in the furnace, where the temperature is higher than the ignition point of the untreated fuel. The above and other objects I attain by coating the fuel with a suitable protector which will expose the fuel to action only when the predetermined temperature has been reached.

The fuel, such as coke, or any other similar combustible material, is coated by spraying it with a suitable solution or fluent mixture comprising the particular protective agent employed, or by dipping it thereinto, or applying it to the fuel in any other suitable and practicable way. The said coating on the fuel is, in the ordinary use of the term, incombustible; and it therefore lessens the initial combustibility of the fuel. When the so-coated fuel is to be used in a blast furnace, for example, the charge contains the coated fuel, the ore, flux, sinters, etc. The charge containing the coated fuel will not be consumed at the upper part of the furnace where the temperature is sufficiently high to ignite non-coated fuel; therefore the undesirable hot tops formed by the incandescence of the fuel will be avoided, and, also, the consumption of the fuel at the upper part will be prevented, thus saving the fuel from burning at the top of the charge where it is useless. Furthermore, the coating used on the fuel, by postponing combustion with its attendant intense heat to a lower zone, will prevent the sticking of the charge in the upper part of the furnace, and thus there will be no wall accretions. Employment of the coated fuel keeps the heat in a furnace well down toward the twyer line or just above the same, that is, in the fusion zone. It also prevents bad accretions at the twyer line. It helps to make a hot slag and to get a better settlement because of the hotter slag, that is, the reduced metal has a longer time to settle, due to the slag remaining hotter and therefore more fluid than slag produced by ordinary fuel. Many other advantages are connected with the use of a coated fuel, which are self-evident, and, therefore, the description of which are omitted.

It is evident that I may release the coated fuel to combustion in any part of the furnace, that is, cause it to burn at any desired height in the stack, by selecting a coating for the fuel which will melt at a temperature of that particular part of the stack, and so regulate the action of the furnace as to temperature in any stack as I may wish.

As a coating for the fuel I may employ a flux which has a suitable melting point. Or I may provide a coating comprising the ore to be treated combined with a suitable proportion of impurities or other fluxing materials to render it fusible at the desired temperature. For example, in lead blast furnaces I find that a very suitable coating material is a mixture of lead sulfate, lead oxid and a varying percentage of impurities, the mixture to contain about 60% of lead. This makes a good pigment which sticks to the coke and protects it from the fire and from burning until it reaches the lower part of the furnace.

As further advantages of my process, it may be noted that it enables me to use a smaller size of coke than would otherwise be possible; and in iron blast furnaces the amount of carbon monoxid given off may be materially reduced.

I am aware that it is old to add finely divided ore or blast furnace fines to powdered or finely divided coal or coke and to briquet the mixture, and I do not claim such treatment of fuel. I believe, however, it is new to treat, in the manner described herein, fuel of a size adapted to be charged into a blast furnace without briqueting, and I have employed the word "massive" in certain of the appended claims to differentiate a fuel of such size from that which requires briqueting before it can be employed in a blast furnace.

Having thus described my invention, what I claim as new and desire to secure by Letters Patent is:

1. A step in the reduction of metals from their ores in blast furnaces by carbon from solid fuel, comprising providing said fuel with a coating of an appreciable thickness of the ore to be treated in the furnace.

2. A step in the reduction of metals from their ores in blast furnaces by carbon from solid fuel, consisting in providing said fuel with a coating of an appreciable thickness of the ore to be treated in the furnace combined with sufficient other materials to flux said coating.

3. A step in the reduction of lead from its ores in a blast furnace, comprising providing the fuel with a coating of an appreciable thickness of oxid of lead.

4. A step in the reduction of lead from its ores in a blast furnace, consisting in providing the fuel with a coating of an appreciable thickness of oxid of lead, sulfate of lead and impurities.

5. A process for the reduction of metals from their ores consisting in charging into a blast furnace the ore to be reduced, a proper amount of flux and carbon in the shape of solid fuel, said fuel having a coating of material adapted to protect said fuel from combustion at its ignition point but adapted to fuse to liberate the fuel to combustion at some predetermined point in the travel of the charge through the furnace, said point being where the temperature is higher than the ignition point of the fuel, and subjecting the charge to the action of an oxidizing blast.

6. In the reduction of metals from their ores by the use of massive carbonaceous fuel, the process which comprises providing such fuel with a protective coating comprising a compound of the metal sought, and charging the coated fuel and the ore to be reduced into a blast furnace.

7. In the reduction of metals from their ores by the use of solid carbonaceous fuel, the process which comprises providing such fuel with a protective coating comprising the ore to be reduced, and charging the coated fuel and further quantities of said ore into a blast furnace.

8. As an article of manufacture, a fuel for use in a metallurgical furnace having a coating of an appreciable thickness of the ore to be reduced in said furnace.

In testimony whereof I have signed my name to this specification in the presence of two subscribing witnesses.

WILLIAM D. KILBOURN.

Witnesses:
WM. S. MARKS,
J. A. PHIPPS.